Figures 1, 2:
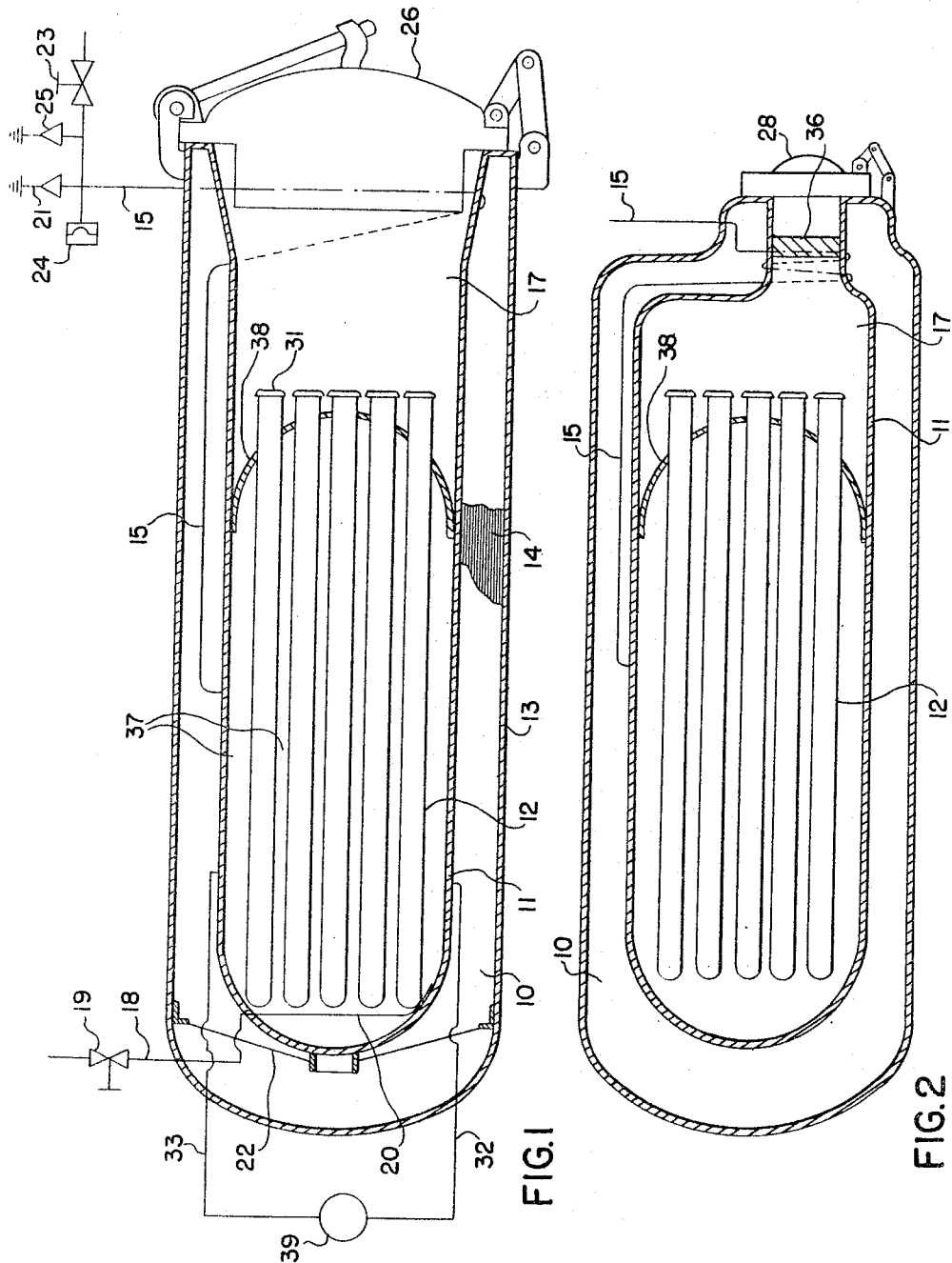

May 23, 1967 R. S. PAULIUKONIS 3,320,757
CRYOGENIC PRESERVER

Filed April 15, 1966 3 Sheets-Sheet 1

INVENTOR
RICHARD S. PAULIUKONIS

BY
ATTORNEYS

United States Patent Office 3,320,757
Patented May 23, 1967

3,320,757
CRYOGENIC PRESERVER
Richard S. Pauliukonis, Cleveland, Ohio, assignor to Cryobank, Inc., Cleveland, Ohio, a corporation of Delaware
Filed Apr. 15, 1966, Ser. No. 542,883
6 Claims. (Cl. 62—45)

This invention relates to cryogenic means for storing objects or substances at liquefied gas temperatures. The invention is appropriate for freezing and preserving various substances and objects. In one application it can be used to preserve human bodies for extended periods at or near liquid nitrogen temperatures in metal boxes that function as caskets and at economical liquefied gas consumption rates. This may be referred to as cryoembalming. In other applications, the storage means of the invention can receive and store other objects and substances, and stored matter can be added to or wholly or partly removed or replaced from time to time as desired.

The invention will be described with particular reference to cryoembalming, since this presently appears to be an important application. No rapidly destructive processes are presently known to occur in simple or complex organisms between about minus 100° C. and absolute zero. (However gradual accumulation of changes on an atomic scale due to naturally occurring ionizing radiation remains a theoretical possibility as an extremely slow destructive process, although the shielding provided by materials of construction and/or insulation in apparatus contemplated by the invention offers a significant protection factor). Theoretically, any organism that can survive cooling below about minus 100° C. and be rewarmed to normal biological temperatures can be maintained indefinitely, if not perpetually, even in the viable state by storage at temperatures below minus 150° C. See P. Mazur, Basic Problems in Cryobiology, 9 Advances in Cryogenic Engineering 36 (1964); also A. U. Smith, Biological Effects of Freezing and Supercooling, Williams and Wilkins Co., Baltimore, Md. However cryoembalming is not presently directed to the preservation of whole body viability because this has not yet been shown to be attainable for human beings or other extremely complex organisms that are subjected to very low temperatures. Cryoembalming does make possible the storage and preservation of human bodies or other complex organisms for time intervals of indefinite duration without any significant change in shape or appearance. Indeed it appears that human bodies can be held in a frozen-state condition that, biologically, will remain almost absolutely stable for an indefinite interval of months, years, or millenniums. To maintain a body in such a steady-state frozen condition over long intervals of time, efficient equipment must be used to insure low temperatures and economy of operating cost. It is an object of the present invention to provide such equipment. It is a further object of the invention to provide equipment that is adapted to loading and unloading from time to time, as required.

The invention contemplates the provision of a vacuum jacket having an outer wall which may be exposed to ambient conditions and temperatures, and an inner wall defining a jacketed chamber. The jacketed chamber is divided by a transverse wall into a liquid cell and an access cell. A number of hollow storage members, which may be of tubular configuration, communicate with the access cell and extend through the transverse wall and into the liquid cell in sealed relationship with the latter.

Figure 3:
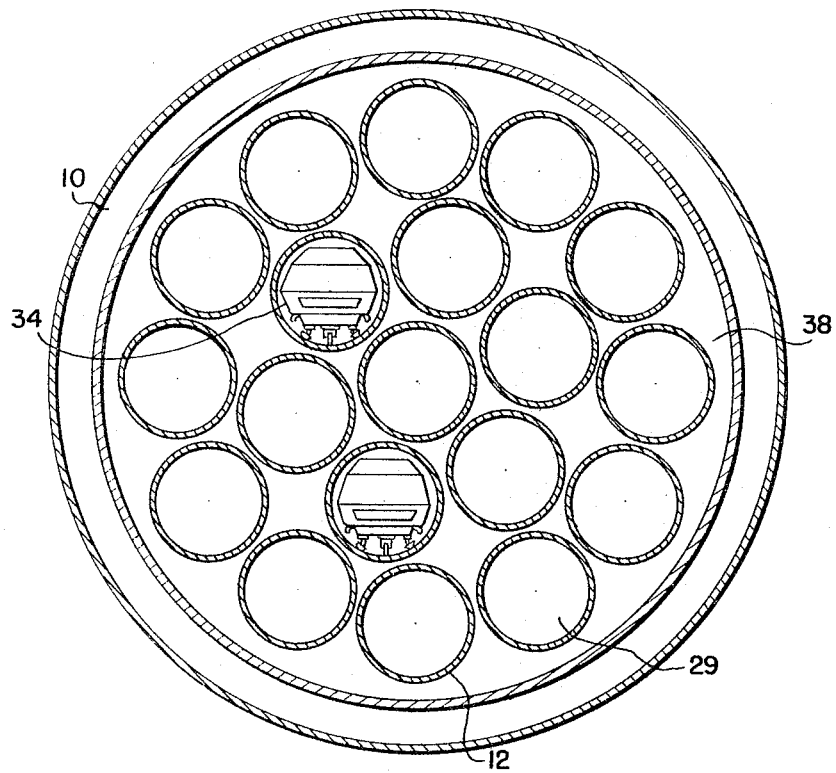
Figure 4:
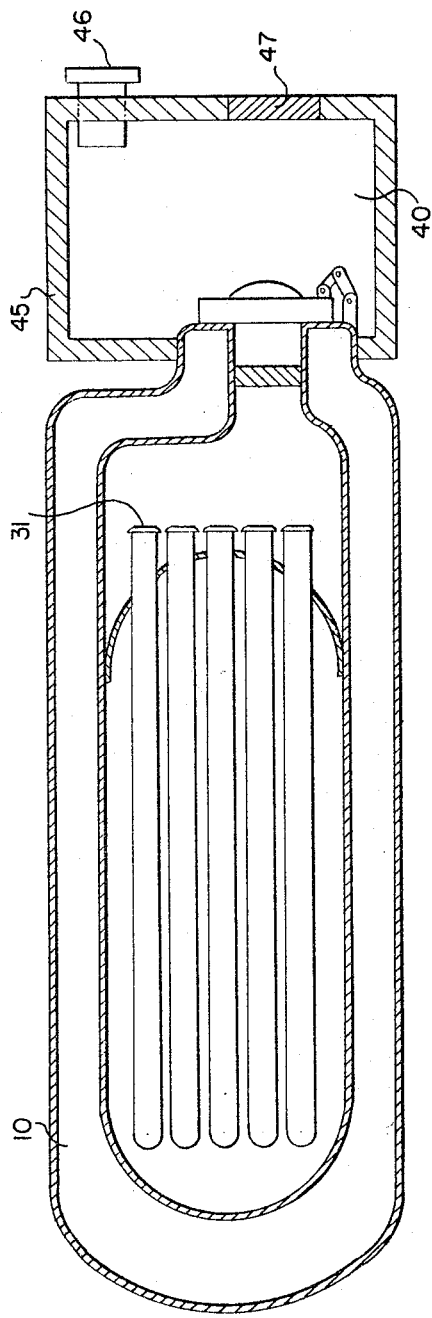

In the drawings, FIGURE 1 is a schematic cross-sectional view of a cryogenic preserver illustrating the present invention. FIGURE 2 is a schematic cross-sectional view illustrating a modification of the apparatus shown in FIGURE 1. FIGURE 3 is a schematic cross-sectional view taken on the plane of line A—A in FIGURE 1 or 2, but with the covers for the open ends of the hollow storage members removed. FIGURE 4 is similar to FIGURE 2, but illustrates the provision of an antechamber in association with the previously illustrated apparatus.

The illustrated cryogenic apparatus comprises a vacuum jacket 10 having an inner wall 11 and an outer wall 13. Suitable insulating material 14 may be employed in the vacuum space of the vacuum jacket 10. The inner wall 11 of the vacuum jacket defines a large jacketed chamber 17, 37 which is divided by a transverse wall 38. The transverse wall 38 divides the jacketed chamber into the access cell 17 and the liquid cell 37. The rear end of the inner wall 11 is supported by suitable rods 22 or the like. The front end of the inner wall 11 is supported at its juncture with the outer wall 13 at the front end of the vacuum jacket.

The mouth at the front end of the vacuum jacket 10 provides a portal that opens from the exterior of the vacuum jacket into the access cell 17 at a location that is spaced from the transverse wall 38 so that a relatively long heat path is provided between the portal and the liquid cell 37.

A plurality of hollow storage members 12 have open ends or mouths 29 (FIGURE 3) in communication with the access cell 17. The storage members 12 extend through the transverse wall 38 and into the liquid cell 37 in sealed relationship therewith. Removable lids or covers 31 may be provided for the open ends of the hollow storage members.

Fluid lines are provided for filling and venting the liquid cell 37. A vent line 15 from the top of the liquid cell is placed in heat-absorbing relationship with the inner wall 11 of the vacuum jacket 10 between the transverse wall 38 and the portal of the vacuum jacket. A fill line 18 is provided with a manual valve 19 and enters the liquid cell 37 at the rear head. It terminates in a downwardly directed dip tube 20 for filling and eventual liquid withdrawal. The line 32 running from the lowest part of the liquid cell 37 serves as the liquid leg for the external liquid level gage 39. The line 33 running from the top of the liquid cell serves as the gas leg for the same gage.

A low pressure breather valve 21 is set at approximately one pound pressure to automatically discharge normal boil-off gases from the vent line 15. If desired this valve may discharge into the access cell 17, and a supplemental vent and vent valve (not shown) may be employed to vent the access cell 17 to atmosphere. This is one way to purge the access cell of atmospheric air after it is sealed from atmosphere by closing the door 26.

A manual vent valve 23 is also provided to accommodate larger quantities of vapor released during the filling operation. A burst disc 24 and a safety release valve 25 provide supplemental safety devices to guard against excessive pressure build-up in the liquid cell 37.

When the container is being charged with liquid through the fill line 18, the vapors formed during filling can pass out through the vent 15 cooling the inner wall of the vacuum jacket between the transverse wall 38 and the portal mouth that is closed by the door 26. In normal operation, however, the boil-off is controlled by the valve 21 and may not be sufficient to cool the inner jacket wall in the vicinity of the large door such as that shown in FIGURE 1. However in the apparatus shown in FIGURE 2, the inner jacket wall 11 is necked down between the transverse wall 38 and the relatively small door 28. This necked-down inner wall leads to an access portal of greatly reduced size and renders the container more efficient. Efficiency is further improved by adding a radiation barrier or plug 36 which may constitute any suitable barrier material. The barrier or plug 36 may be positioned inwardly from the door 28, so that the wall 38 and tubes 12 do not "see" the warmer parts of the inner wall 11 near the door 28.

In FIGURE 3 the open ends 29 of the hollow storage members 12 are seen. In cryoembalming applications, these storage members may be elongated tubes that are circular in cross-section. Simple containers or caskets 34 of aluminum or other suitable material may be employed and may be provided with casters or wheels to facilitate their insertion into the storage members 12, and/or guideways or tracks (not shown) may be provided. In such a use the hollow storage members 12 serve as vaults or crypts for the indefinitely prolonged storage of human bodies without the replacement of natural body fluids as in conventional embalming. Each storage member 12 may be of a length to receive from one to five or more caskets.

When human bodies or other objects or substances are placed in the hollow storage members 12, which are completely surrounded by liquid nitrogen, they will be maintained at about minus 190° C. for as long as the container is filled with the refrigerant. If a human corpse has been only partially cooled, it will be further cooled to this low temperature after it is placed in the crypt.

Refilling of the liquid cell of the container is required at intervals of from 20 days to many months, depending on the size of the container. When the liquid level in the liquid cell 37 drops to approximately one-third of refrigerant capacity, refilling is indicated.

The covers or lids 31 are provided to reduce the amount of ambient air entering the interiors of the hollow storage members 12 during opening of the door 26 or 28, and to reduce the amount of air to be subsequently purged from the access cell 17. To further inhibit the introduction of ambient air to the access cell 17 and any of the hollow storage members 12, and to reduce heat influx during door opening, an insulated antechamber 40 may be provided as shown in FIGURE 4. The antechamber 40 may be provided with insulated walls 45 and a blast freezer 46 capable of reducing internal antechamber temperature from atmospheric to minus 30° C. or minus 45° C. The antechamber may be provided with an insulated door 47. It may serve to temporarily store precooled corpses. It may be adapted to be removed from the illustrated cryogenic container and to be coupled to other similar containers.

The invention is not restricted to the slavish imitation of each and every one of the details described above which have been set forth merely by way of example with the intent of most clearly setting forth the teachings of the invention. Obviously devices may be provided which change, eliminate or add certain specific structural details without departing from the invention.

What is claimed is:
1. Cryogenic storage means comprising a vacuum jacket having an outer wall and having an inner wall defining a jacketed chamber, a transverse wall within the jacketed chamber dividing it into a liquid cell and an access cell, fluid line means for filling and venting the liquid cell, a portal opening from the exterior of said vacuum jacket into said access cell at a location spaced from said transverse wall, closure means for said portal, a plurality of hollow storage members having open or openable ends in communication with the access cell and extending through the transverse wall and into the liquid cell in sealed relationship therewith.

2. Means as defined in claim 1, including covers for the open ends of the hollow storage members.

3. Means as defined in claim 1, including an insulated antechamber communicating with said access chamber through said portal, and cooling means for said antechamber.

4. Means as defined in claim 1, including a fluid line in heat-absorbing relationship with the inner wall of said vacuum jacket between said transverse wall and said portal.

5. Means as defined in claim 1, radiation barrier plug means removably placed in said portal inwardly spaced from said closure means.

6. Cryogenic storage means comprising a generally cylindrical vacuum jacket having a front end and a rear end, said vacuum jacket having an outer wall and an inner wall both extending from said front end to said rear end, said outer and inner walls extending completely across said rear end, said inner wall defining a jacketed chamber, a transverse wall within the jacketed chamber dividing it into a liquid cell extending from the rear end of said vacuum jacket and an access cell extending from the front end of said vacuum jacket, fluid line means for filling and venting the liquid cell, a portal opening from the exterior of said vacuum jacket into said access cell at said front end of said vacuum jacket, closure means for said portal, a plurality of tubular members having open or openable ends in communication with the access cell and extending through the transverse wall and into the liquid cell in sealed relationship therewith.

References Cited by the Examiner
UNITED STATES PATENTS

| | | | |
|---|---|---|---|
| 1,504,844 | 8/1924 | Sterne | 62—373 X |
| 2,513,355 | 7/1950 | Peckinpaugh | 62—62 |
| 3,092,974 | 6/1963 | Haumann et al. | 62—62 |
| 3,255,597 | 6/1966 | Carter | 62—64 X |

LLOYD L. KING, *Primary Examiner.*